US012335295B2

(12) United States Patent
Shachar et al.

(10) Patent No.: US 12,335,295 B2
(45) Date of Patent: Jun. 17, 2025

(54) SYSTEM AND METHOD FOR MANAGEMENT OF SYSTEM VULNERABILITIES

(71) Applicant: Dell Products L.P., Round Rock, TX (US)

(72) Inventors: Tomer Shachar, Beer Sheva (IL); Maxim Balin, Gan-Yavne (IL); Yevgeni Gehtman, Modi'in (IL)

(73) Assignee: Dell Products L.P., Round Rock, TX (US)

( * ) Notice: Subject to any disclaimer, the term of this patent is extended or adjusted under 35 U.S.C. 154(b) by 314 days.

(21) Appl. No.: 18/302,274

(22) Filed: Apr. 18, 2023

(65) Prior Publication Data

US 2024/0356953 A1    Oct. 24, 2024

(51) Int. Cl.
H04L 29/00        (2006.01)
*H04L 9/40*       (2022.01)
*H04L 41/085*     (2022.01)

(52) U.S. Cl.
CPC ........ *H04L 63/1433* (2013.01); *H04L 41/085* (2013.01)

(58) Field of Classification Search
CPC .................. H04L 63/1433; H04L 41/085
See application file for complete search history.

(56) References Cited

U.S. PATENT DOCUMENTS

| | | | |
|---|---|---|---|
| 9,098,333 B1* | 8/2015 | Obrecht | G06F 9/50 |
| 9,137,110 B1* | 9/2015 | Adogla | H04L 41/145 |
| 9,215,158 B1* | 12/2015 | Adogla | G06F 11/008 |
| 9,619,772 B1* | 4/2017 | Adogla | G06Q 10/0635 |
| 11,671,486 B1* | 6/2023 | McCullagh | H04L 67/1034 |
| | | | 709/226 |
| 11,676,087 B2* | 6/2023 | Hogg | G06N 20/20 |
| | | | 726/25 |
| 2006/0101520 A1* | 5/2006 | Schumaker | H04L 63/1433 |
| | | | 726/25 |
| 2006/0191012 A1* | 8/2006 | Banzhof | G06Q 10/06311 |
| | | | 726/25 |
| 2010/0257132 A1* | 10/2010 | Collard | G06Q 10/06 |
| | | | 709/224 |
| 2012/0304300 A1* | 11/2012 | LaBumbard | G06F 21/577 |
| | | | 726/25 |
| 2014/0006336 A1* | 1/2014 | Khan | G09B 9/00 |
| | | | 706/52 |
| 2014/0337982 A1* | 11/2014 | Crosby | H04L 63/1433 |
| | | | 726/25 |
| 2017/0017795 A1* | 1/2017 | DiGiambattista | G06F 21/577 |
| 2017/0147338 A1* | 5/2017 | Jackson | G06F 8/71 |
| 2018/0068241 A1* | 3/2018 | Varkey | G06Q 10/0635 |
| 2018/0196402 A1* | 7/2018 | Glaser | G05B 19/042 |
| 2018/0336356 A1* | 11/2018 | Papaxenopoulos | G06F 8/65 |

(Continued)

*Primary Examiner* — Don G Zhao
(74) *Attorney, Agent, or Firm* — WOMBLE BOND DICKINSON (US) LLP

(57) ABSTRACT

Methods and systems for managing vulnerabilities presented by data processing systems are disclosed. The vulnerabilities may be managed by identifying components of the data processing systems using different processes depending on the computing resource availabilities of the data processing systems. Once identified, corresponding vulnerabilities for the components may be identified. The identified vulnerabilities may then be managed by performing various actions.

20 Claims, 5 Drawing Sheets

(56) References Cited

U.S. PATENT DOCUMENTS

| | | | |
|---|---|---|---|
| 2018/0341519 A1* | 11/2018 | Vyas | G06F 9/4856 |
| 2018/0351987 A1* | 12/2018 | Patel | G06F 21/577 |
| 2019/0250898 A1* | 8/2019 | Yang | H04W 12/08 |
| 2019/0327324 A1* | 10/2019 | Buffone | H04L 67/564 |
| 2019/0342324 A1* | 11/2019 | Nawy | G06F 16/2228 |
| 2019/0361466 A1* | 11/2019 | Obropta, Jr. | G05D 1/0011 |
| 2019/0384632 A1* | 12/2019 | Parikh | G06F 21/554 |
| 2020/0012571 A1* | 1/2020 | Singhal | G06F 11/1451 |
| 2020/0019465 A1* | 1/2020 | Khan | G06F 16/188 |
| 2021/0327018 A1* | 10/2021 | Carranza | H04L 67/10 |
| 2024/0039927 A1* | 2/2024 | Narayan | H04L 63/145 |
| 2024/0054230 A1* | 2/2024 | Bouchard | G06F 21/577 |
| 2024/0134997 A1* | 4/2024 | Madala | G06F 8/65 |
| 2024/0356953 A1* | 10/2024 | Shachar | H04L 41/085 |

* cited by examiner

SYSTEM AND METHOD FOR MANAGEMENT OF SYSTEM VULNERABILITIES

FIELD

Embodiments disclosed herein relate generally to vulnerabilities management. More particularly, embodiments disclosed herein relate to systems and methods to identify and manage vulnerabilities.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
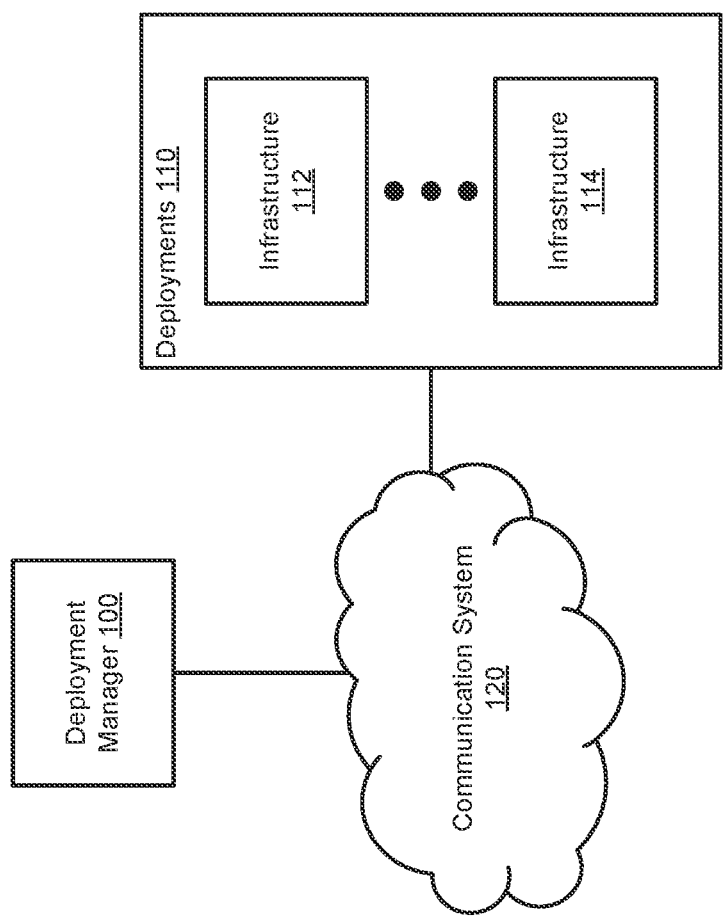
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing vulnerabilities that may be exhibited by data processing systems. To manage the vulnerabilities, components of the data processing systems may be identified. Once identified, the characteristics of the components may be used to identify whether the components are likely to exhibit any vulnerabilities.

Malicious entities may attempt to exploit the vulnerabilities to, for example, compromise the data processing systems. To reduce the likelihood of the data processing systems being compromised, remediations may be performed.

To manage computing resource expenditures, different methods for identifying the components of the data processing systems may be performed. For data processing systems with ample computing resources, the data processing system may perform various actions to identify and validate its own components. The data processing system may then report its components to other entities.

However, if data processing systems with reduced levels of available computer resources attempt to perform similar actions, other functionalities provided by the data processing systems may be hindered. To identify components of these data processing systems, other processes that use historical information regarding the data processing systems may be utilized. Consequently, component lists for the data processing systems may be obtained without consuming the limited computing resources of the data processing systems.

By doing so, embodiments disclosed herein may more efficiently marshal limited computing resources to provide both primary functionalities of data processing systems while also managing vulnerabilities that may be exhibited by the data processing systems.

In an embodiment, a method for managing deployments is disclosed. The method may include identifying infrastructure of the deployment for vulnerability analysis; identifying computing resource availability for the infrastructure; making a determination, based on the computing resource availability, whether to perform an infrastructure based component analysis for the infrastructure that consumes at least a portion of computing resources of the infrastructure; in a first instance of the determination where the infrastructure based component analysis is to be performed: performing the infrastructure based component analysis of the infrastructure to obtain a first component inventory for the infrastructure; performing the vulnerability analysis using the first component inventory to identify a first at least one vulnerability; performing a remediation for the infrastructure based on the first at least one vulnerability; in a second instance of the determination where the infrastructure based component analysis is not to be performed: performing a historic component analysis of the infrastructure to obtain a second component inventory for the infrastructure, the historic component analysis not consuming any computing resources of the infrastructure; performing the vulnerability analysis using the second component inventory to identify a second at least one vulnerability; and performing a remediation for the infrastructure based on the second at least one vulnerability.

Identifying the computing resource availability for the infrastructure may include identifying types of data processing systems of the infrastructure; and matching the types of the data processing systems to corresponding quantities of computing resources to identify the computing resource availability.

Making the determination may include making a comparison between the computing resource availability and a computing resource availability threshold; in a first instance of the comparison where the computing resource availability exceeds the computing resource availability threshold: determining to perform the infrastructure based component analysis; in a second instance of the comparison where the computing resource availability does not exceed the computing resource availability threshold: determining to not perform the infrastructure based component analysis.

Performing the historic component analysis of the infrastructure to obtain the second component inventory for the infrastructure may include obtaining a first component list for the infrastructure, the first component list being based on a design for the infrastructure prior to the infrastructure being deployed; obtaining a second component list for the infrastructure, the second component list being based on an operator provided report for the infrastructure after the infrastructure being deployed; and identifying a third component list for the infrastructure using the first component list and the second component list.

Performing the infrastructure based component analysis of the infrastructure to obtain the first component inventory for the infrastructure may include scanning data processing systems of the infrastructure to obtain a fourth component list.

Scanning the data processing systems may include sending instructions to the data processing systems of the infrastructure to initiate performance of a self-inventory by the data processing systems; receiving copies of self-inventories from the data processing systems; and obtaining the fourth component list using the self-inventories, each of the self-inventories specifying self-identified components of the data processing systems.

Performing the vulnerability analysis using the second component inventory to identify a second at least one vulnerability may include for each component specified by the third component list: matching at least one of a type of the component, and a version of the component against vulnerabilities in a vulnerability repository to identify the second at least one vulnerability.

In an embodiment, a non-transitory computer readable media (e.g., a machine readable medium) is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, the system of FIG. 1 may include deployments 110. A deployment may include collections of various infrastructure 112, 114. Infrastructure may include any number of data processing systems that may provide all or a portion of the computer implemented services (e.g., cooperatively and/or independently). Different infrastructure and deployments may provide similar or different computer implemented services.

To provide the computer implemented services, deployments 110 may be operably connected to various networks including, for example, the Internet. These connections may present risk to any of the data processing systems. For example, a malicious entity may attempt to compromise any of the data processing systems.

To compromise the data processing systems, the malicious entities may utilize various hardware and/or software based vulnerabilities. While generally implementing various security management frameworks, these vulnerabilities may bypass the protections provided by these frameworks.

To reduce the likelihood of any of the components of deployments 110 from being compromised, the components of the deployments 110 may need to be periodically analyzed (e.g., against known vulnerabilities that may be discovered overtime). Various remediations may then be performed based on the vulnerabilities to limit the impact of compromise and/or prevent compromise via the identified and remediated vulnerabilities.

To identify the vulnerabilities, information regarding the components of deployments 110 may be used. For example, types of components, workloads being performed, configurations, versions, and/or other types of information regarding these components may be used to identify whether the components present vulnerabilities. As new vulnerabilities are identified, associations to similar information regarding the components may be established such that lookups or other types of processing operations may be performed based on the information to identify whether corresponding vulnerabilities for the components exist.

However, collecting such information may be resource intensive. For example, collecting such information expend computing resources of the data processing systems of the deployments. If any of the infrastructure lacks sufficient computing resources for collecting this information (e.g., through scanning processes) while also providing other functionalities, then collecting such information may be detrimental to the computer implemented services provided, at least in part, by the infrastructure.

In general, embodiments disclosed herein may provide methods, systems, and/or devices for identifying and/or initiating remediations for vulnerabilities in deployments with reduced levels of interference with other functions provided by data processing systems. The vulnerabilities may be identified by, rather than performing active scanning processes, using historical information and/or pre-gathered information reflecting the likely component loadout of infrastructure. By using the historical information and/or pre-gathered information, a component list for infrastructure may be developed without consuming any or consuming reduced levels (e.g., when compared to active scanning) of computing resources. The identified components likely to be present in the infrastructure may be used to identify vulnerabilities likely to be presented by the infrastructure. Various remediation processes may then be initiated to manage the vulnerabilities. Consequently, the infrastructure may be less likely to be compromised by malicious entities.

To provide the above noted functionality, the system of FIG. 1 may include deployment manager 100, deployments 110, and communication system 120. Each of these components is discussed below.

Figure 2A:
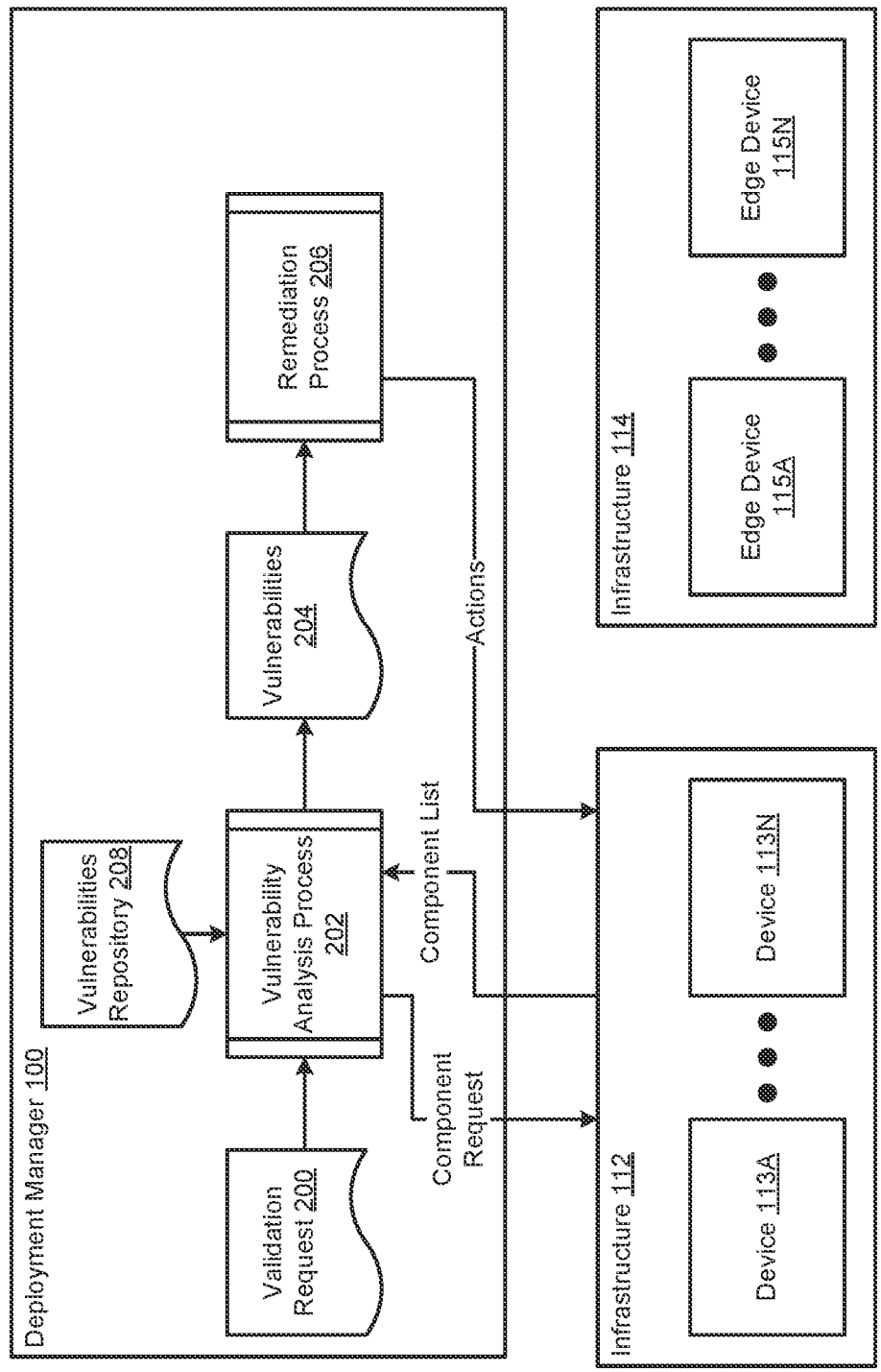
FIGS. 2A-2B show diagrams illustrating data flows in accordance with an embodiment.
Figure 2B:
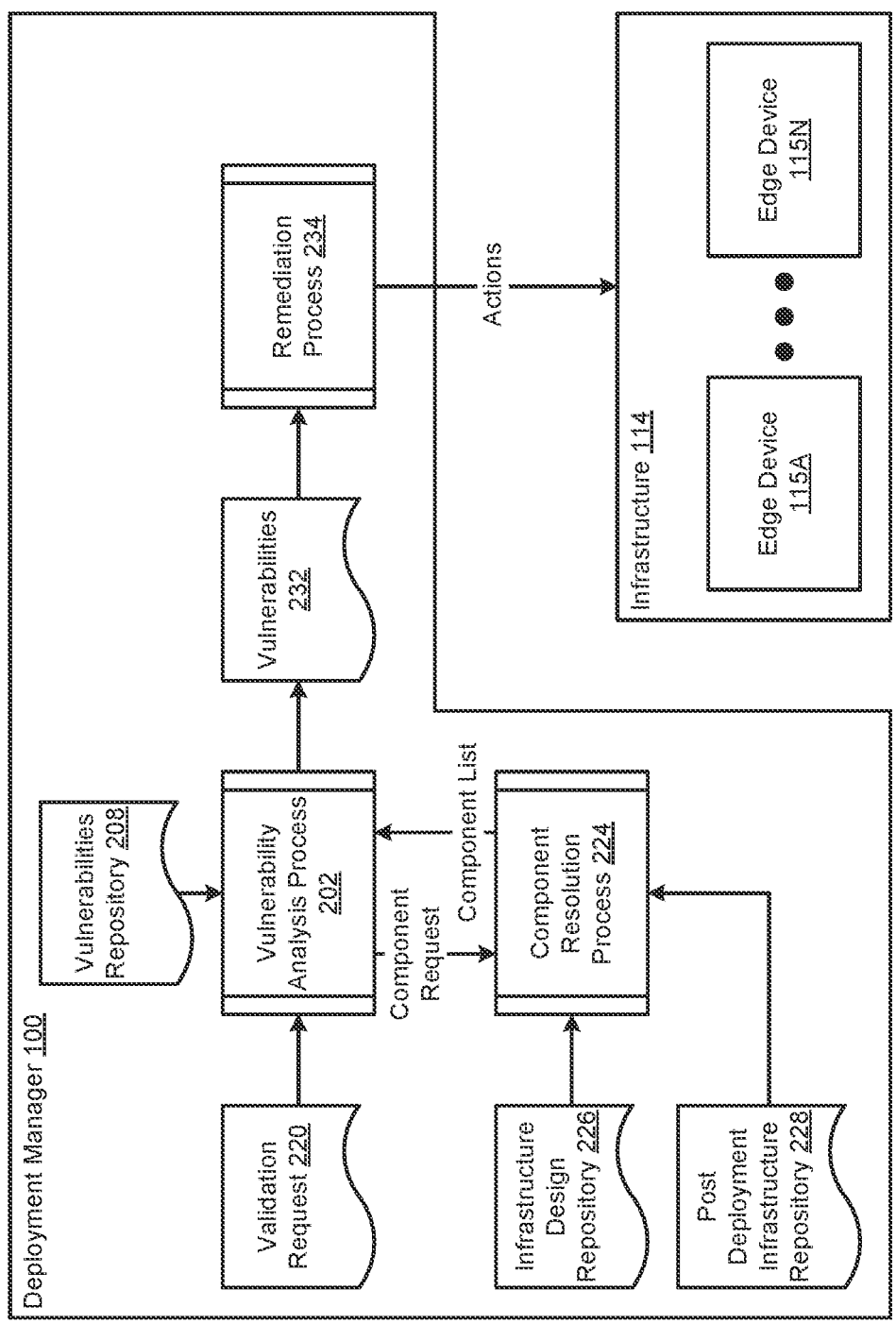

Deployment manager 100 may manage vulnerabilities presented by deployments 110. To do so, deployment manager 100 may (i) identify whether active scanning of infrastructure is likely to interfere with the infrastructure due to lack of available computing resources, (ii) obtain information regarding the components of the infrastructure either through active analysis of infrastructure or analysis of historic information regarding the infrastructure, depending on whether the infrastructure is likely to be interfered with, (iii) use the information regarding the components to identify vulnerabilities, and (iv) initiate remediations to manage the vulnerabilities. Refer to FIGS. 2A-2B for additional details regarding management of vulnerabilities.

Deployments 110 may include any number of collections of infrastructure 112-114. The deployments may provide various computer implemented services. Different infrastructure may include different types of data processing systems having different levels of available computing resources.

For example, some infrastructure may be implemented using high density computing environments which may include ample computing resources and good accessibility. In contrast, other infrastructure such as edge infrastructure may include limited computing resources (e.g., enough to provide primary functions but little else) and may have limited accessibility (e.g., positioned not in high density environments such as data centers).

As noted above, data processing systems of the infrastructure may be subject to compromise. To reduce the likelihood of compromise, deployment manager 100 may monitor and/or initiate remediations for the infrastructure. Deployment manager 100 may select how to monitor the infrastructure (e.g., via active scanning which may consume computing resources of the infrastructure or analysis of historical information which may consume fewer or no computing resources of the infrastructure) depending on the availability of computing resources of each infrastructure collection. By doing so, deployment manager 100 may be less likely to negatively impact the primary functionalities of infrastructure 112-114 while managing impacts of vulnerabilities of the infrastructure.

Figure 3:
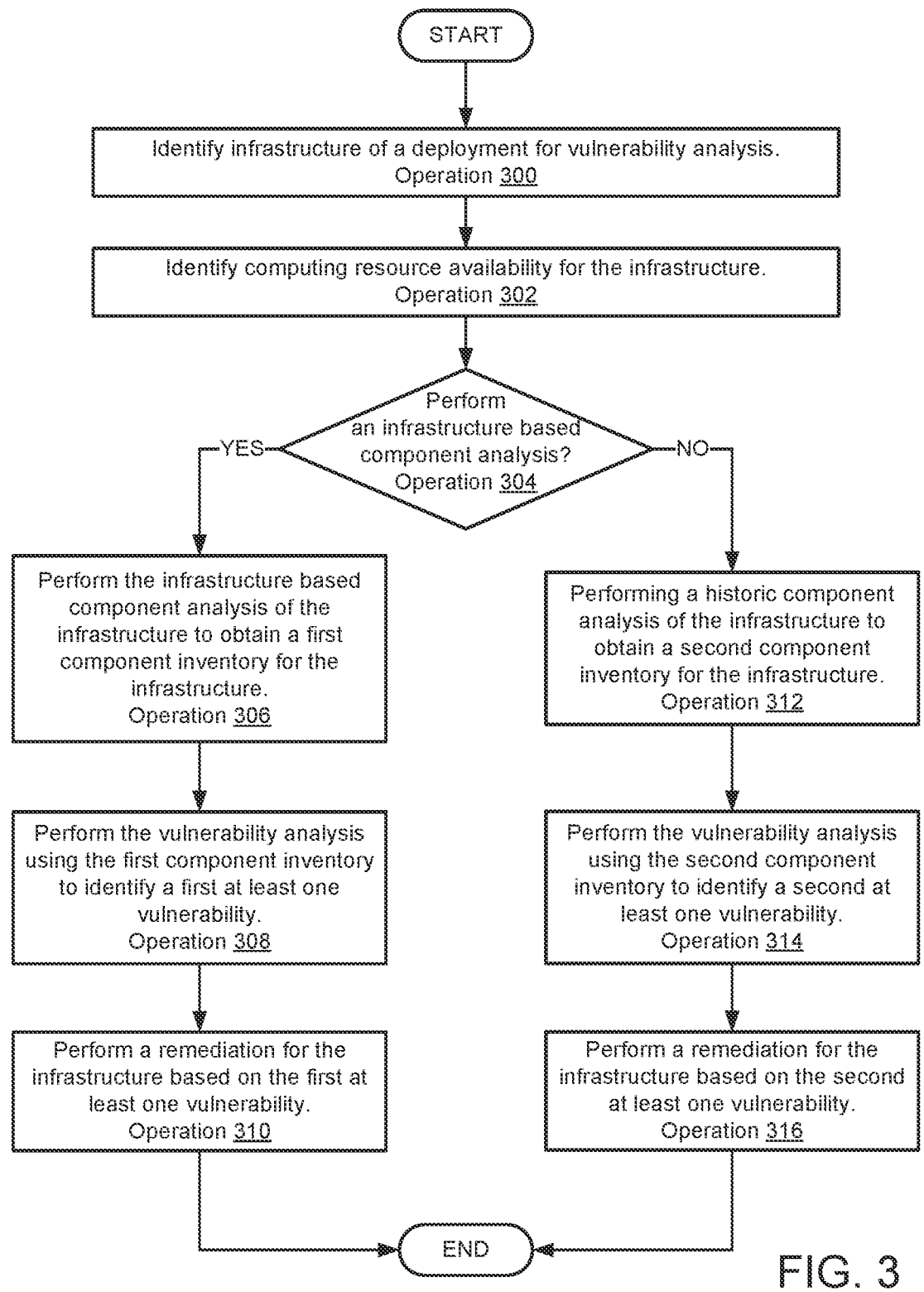
FIG. 3 shows a flow diagram illustrating a method in accordance with an embodiment.

When providing their functionality, any of deployment manager 100 and deployments 110 may perform all, or a portion, of the method illustrated in FIG. 3.

Any of deployment manager 100 and deployments 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

As discussed above, deployment manager 100 may facilitate management of infrastructure. FIGS. 2A-2B show data flow diagrams in accordance with embodiments that illustrate data flows that may occur while different types of management operations are performed for different types of infrastructure.

Turning to FIG. 2A, a first data flow diagram illustrating data flows, data processing, and/or other operations that may be performed by the system of FIG. 1 in accordance with an embodiment is shown. The first data flow diagram may illustrate data flows that may occur when infrastructure that has sufficient computing resources is analyzed to manage vulnerabilities. In FIG. 2A, a first set of shapes (e.g., 200, 204, 208) is used to represent data structures, a second set of shapes (e.g., 202, 206) is used to represent processes performed using data, and a third set of shapes (e.g., 100, 112-115B) is used to represent physical devices that may host the data and processes.

To initiate management of infrastructure, deployment manager 100 may obtain validation request 200. Validation may be a request to validate whether vulnerabilities exist in infrastructure 112.

Infrastructure 112, in this example, may include devices (e.g., 113A-113N) that have ample access to computing resources. For example, the devices may be servers of a data center environment. Consequently, device 113A-113N are unlikely to suffer negative impacts for performing various operations for component validation.

Once obtained, validation request 200 may be used during vulnerability analysis process 202 to identify vulnerabilities 204 for infrastructure 112. During vulnerability analysis process 202, a type of infrastructure 112 and/or components thereof may be identified, and/or other characteristics of infrastructure 112 may be identified. The characteristics may be used to identify whether infrastructure 112 is likely to have sufficient free available computing resources such that infrastructure 112 may continue to provide other functionalities while also performing actions to facilitate identification of components of infrastructure 112. In this example, infrastructure 112 has sufficient computing resources. Consequently, a scanning process for infrastructure 112 is initiated and during which component request may be sent to infrastructure 112. Component request may be a request for information regarding the components of infrastructure 112.

Once received, agents or other entities hosted by infrastructure 112, and/or components thereof, may perform various actions (e.g., thereby consuming computing resources) to verify, validate, and/or otherwise identify components of infrastructure 112 that may exhibit various vulnerabilities. For example, an agent may perform an inventory process to identify various components, validation processes, and/or other types of processes that consume computing resources of the host device (e.g., 113A, 113N). The agents may provide a component list or other representation of the identified components to deployment manager 100.

Once obtained, vulnerability analysis process 202 may evaluate the identified components using vulnerabilities repository 208. Vulnerabilities repository 208 may include information usable to identify vulnerabilities for components. For example, vulnerabilities repository 208 may associate component types, versions, and/or other component characteristics with various vulnerabilities. The associations may be used to identify the vulnerabilities that may be exhibited by infrastructure 112, and components thereof. For example, lookups may be performed using the information included in the component list as a key to identify corresponding vulnerabilities (if present). The content of vulnerabilities repository 208 may be established by a subject matter expert, through automated analysis, and/or via other processes.

Once identified, vulnerabilities 204 may indicate the potential vulnerabilities of infrastructure 112. Vulnerabilities 204 may be used as a basis for remediation process 206. During remediation process 206, (i) reports based on vulnerabilities 204 may be generated and/or provided to various entities (e.g., administrators, stored in repositories, etc.), (ii)

actions intended to manage the exhibited vulnerabilities may be performed (and/or initiated), and/or other actions may be performed to manage the identified vulnerabilities of infrastructure 112. Through proactive management, the likelihood of the vulnerabilities being exploited by malicious parties or otherwise causing other issues may be reduced.

However, the data flow shown in FIG. 2A may consume computing resources of infrastructure for which the vulnerabilities are to be managed. If the infrastructure lacks sufficient available computing resources (e.g., processing cycles, memory space, storage space, communication bandwidth), a similar data flow may impact the ability of the infrastructure to provide computer implemented services. To facilitate vulnerability management for infrastructure that lacks sufficient available computing resources, other data flows may be performed, such as the flow illustrated in FIG. 2B.

Turning to FIG. 2B, a second data flow diagram illustrating data flows, data processing, and/or other operations that may be performed by the system of FIG. 1 in accordance with an embodiment is shown. The second data flow diagram may illustrate data flows that may occur when infrastructure (e.g., 114) that lacks sufficient computing resources is analyzed to manage vulnerabilities. In FIG. 2B, a first set of shapes (e.g., 220, 232, 208, 226, 228) is used to represent data structures, a second set of shapes (e.g., 202, 224, 234) is used to represent processes performed using data, and a third set of shapes (e.g., 100, 114-115B) are used to represent physical devices that may host the data and processes.

To initiate management of infrastructure, deployment manager 100 may obtain validation request 220. Validation may be a request to validate whether vulnerabilities exist in infrastructure 114.

Infrastructure 114, in this example, may include edge devices (e.g., 115A-115N) have limited access to computing resources. For example, the edge devices may be positioned outside of high density computing environment that may be more challenging but closer to entities that may consume provided computer implemented services and/or sources of data used in the computer implemented services. Consequently, edge device 115A-115N may be likely to suffer negative impacts for performing various operations for component validation.

Once obtained, validation request 220 may be used during vulnerability analysis process 202 to identify vulnerabilities 232 for infrastructure 114. During vulnerability analysis process 202, a type of infrastructure 114 and/or components thereof may be identified, and/or other characteristics of infrastructure 114 may be identified. The characteristics may be used to identify whether infrastructure 114 is likely to have sufficient free available computing resources such that infrastructure 114 may continue to provide other functionalities while also performing actions to facilitate identification of components of infrastructure 114. In this example, infrastructure 114 lacks sufficient computing resources. Consequently, rather than performing a scanning process as described with respect to FIG. 2A in conjunction with infrastructure 112, an analysis process may be performed that may not consume computing resources of infrastructure 114.

Component resolution process 224 may be performed to obtain a component list. However, rather than being verified through analysis of infrastructure 114, the components of component list may be identified via analysis of historical information regarding infrastructure 114. The historical information may include infrastructure design repository 226 and post deployment infrastructure repository 228.

Infrastructure design repository 226 may include information regarding a design for infrastructure 114. For example, the information may indicate types and quantities of components to be included in infrastructure 114 (e.g., as set out prior to actually deploying infrastructure 114), versions for the components, and/or other information regarding the components.

The information may be organized in any form, and may allow for identification of numbers, types, versions, and/or other characteristics of components that are likely to be present in infrastructure 114 to be identified.

Post deployment infrastructure repository 228 may include information regarding infrastructure 114 after deployment. For example, the information may indicate types and quantities of components that were part of in infrastructure 114 (e.g., as set out prior to actually deploying infrastructure 114), versions for the components, and/or other information regarding the components following deployment. For example, the content of post deployment infrastructure repository 228 may include information reported by an operator of infrastructure 114, information obtained as part of deployment of infrastructure 114, etc.

The information may be organized in any form, and may allow for identification of numbers, types, versions, and/or other characteristics of components that are likely to be present in infrastructure 114 to be identified.

The information from the repositories 226-228 may be used to resolve which components are likely to be included in infrastructure 114, numbers, types, version, of the components, etc. The likely components may be resolved by initially populating a component list using the information from infrastructure design repository 226. The component list may then be updated (e.g., indicating additions, removals, etc.) using post deployment infrastructure repository 228.

Thus, the resulting component list may be obtained without using computing resources of infrastructure 114.

Once obtained, vulnerability analysis process 202 may evaluate the identified components using vulnerabilities repository 208. Vulnerabilities repository 208 may include information usable to identify vulnerabilities for components. For example, vulnerabilities repository 208 may associate component types, versions, and/or other component characteristics with various vulnerabilities. The associations may be used to identify the vulnerabilities that may be exhibited by infrastructure 112, and components thereof. For example, lookups may be performed using the information included in the component list as a key to identify corresponding vulnerabilities (if present). The content of vulnerabilities repository 208 may be established by a subject matter expert, through automated analysis, and/or via other processes.

Once identified, vulnerabilities 232 may indicate the potential vulnerabilities of infrastructure 112. Vulnerabilities 232 may be used as a basis for remediation process 234. During remediation process 234, (i) reports based on vulnerabilities 232 may be generated and/or provided to various entities (e.g., administrators, stored in repositories, etc.), (ii) actions intended to manage the exhibited vulnerabilities may be performed (and/or initiated), and/or other actions may be performed to manage the identified vulnerabilities of infrastructure 114. Through proactive management, the likelihood of the vulnerabilities being exploited by malicious parties or otherwise causing other issues may be reduced without encumbering infrastructure 114 with additional load for component identification.

As discussed above, the components of FIG. 1 may perform various methods to manage operation of infrastructure through identification of vulnerabilities. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing vulnerabilities in accordance with an embodiment is shown. The method may be performed by any of deployment manager 100, deployments 110, and/or other components of the system shown in FIG. 1.

At operation 300, infrastructure of a deployment is identified for vulnerability analysis. The infrastructure may be identified by reading a request for performing an analysis the infrastructure for vulnerabilities. The infrastructure may include some component based on a design prior to deployment, other components added during deployment, and/or additional components added after deployment.

At operation 302, computing resource availability for the infrastructure is identified. The computing resource availability for the infrastructure may be identified by (i) identifying a type of the infrastructure and/or components thereof, (ii) identifying workloads being performed by the infrastructure, and/or via other methods. The computing resource availability may be identified by performing a lookup or other processing operation based on the type of the infrastructure and/or components thereof. The lookup may return information usable to identify the computing resource availability. For example, information may indicating computing resources of components of the infrastructure. The workloads may be used to estimate free computing resources and used computing resources of the computing resources of the components of the infrastructure. The computing resource availability may be based on the free computing resources.

While described with respect to workloads, it will be appreciated that workloads may not be taken into account. For example, the computing resource availability may be based on only the computing resources of the infrastructure.

Similarly, the computing resource availability may be identified based only on the type of the infrastructure. Different types may be associated with different computing resource availabilities.

At operation 304, a determination is made regarding whether an infrastructure based component analysis of the infrastructure should be performed. The determination may be made by comparing the computing resource availability to a threshold or other criteria. The threshold or other criteria may indicate a range of computing resource availability that indicates that the infrastructure based component analysis should be performed.

If the comparison indicates that the infrastructure based component analysis should be performed, then the method may proceed to operation 306. Otherwise the method may proceed to operation 312.

At operation 306, the infrastructure based component analysis of the infrastructure is performed to obtain a first component inventory for the infrastructure. The infrastructure based component analysis may be performed by scanning the infrastructure. The infrastructure may be scanned by causing devices of the infrastructure to perform various actions to identify and report the hosted components. The scanning may consume computing resources of the infrastructure.

At operation 308, a vulnerability analysis using the first component inventory is performed to identify a first at least one vulnerability. The vulnerability analysis may be performed, for example, by matching components in the list, types of the components, and/or other characteristics of the components to known vulnerabilities (e.g., with information regarding the vulnerabilities being stored in a repository).

At operation 310, a remediation for the infrastructure is performed based on the first at least one vulnerability. The remediation may be performed by (i) generating and/or sending reports based on the first at least one vulnerability, (ii) initiating performance of any number and types of actions (e.g., by the infrastructure and/or other entities) to manage an impact of the first at least one vulnerability, and/or by performing other types of actions.

The method may end following operation 310.

Returning to operation 304, the method may proceed to operation 312 if the infrastructure based component analysis is not to be performed.

At operation 312, a historic component analysis of the infrastructure is performed to obtain a second component inventory for the infrastructure. The historic component analysis may be performed by (i) obtaining historic information regarding the infrastructure (e.g., repositories 226, 228, etc.), and (ii) populating the second component inventory with components likely to be in the infrastructure based on the historic information.

The infrastructure based component analysis may be performed by (i) obtaining a first component list for the infrastructure, the first component list being based on a design for the infrastructure prior to the infrastructure being deployed; (ii) obtaining a second component list for the infrastructure, the second component list being based on an operator provided report for the infrastructure after the infrastructure being deployed; and (iii) identifying a third component list for the infrastructure using the first component list and the second component list. The first component list and the second component list may be obtained from repositories 226, 228.

Thus, via operation 312, the second component inventory may be obtained without consuming computing resources of the infrastructure, or otherwise impacting its operation. However, the second component inventory may include inaccuracies with respect to the actual components of the infrastructure. The first component inventory may be more likely to accurately reflect the actual components of the infrastructure.

At operation 314, a vulnerability analysis using the second component inventory is performed to identify a second at least one vulnerability. The vulnerability analysis may be performed, for example, by matching components in the second component inventory, types of the components, and/or other characteristics of the components to known vulnerabilities (e.g., with information regarding the vulnerabilities being stored in a repository).

At operation 316, a remediation for the infrastructure is performed based on the second at least one vulnerability. The remediation may be performed by (i) generating and/or sending reports based on the second at least one vulnerability, (ii) initiating performance of any number and types of actions (e.g., by the infrastructure and/or other entities) to manage an impact of the second at least one vulnerability, and/or by performing other types of actions. The method may end following operation 316.

Figure 4:
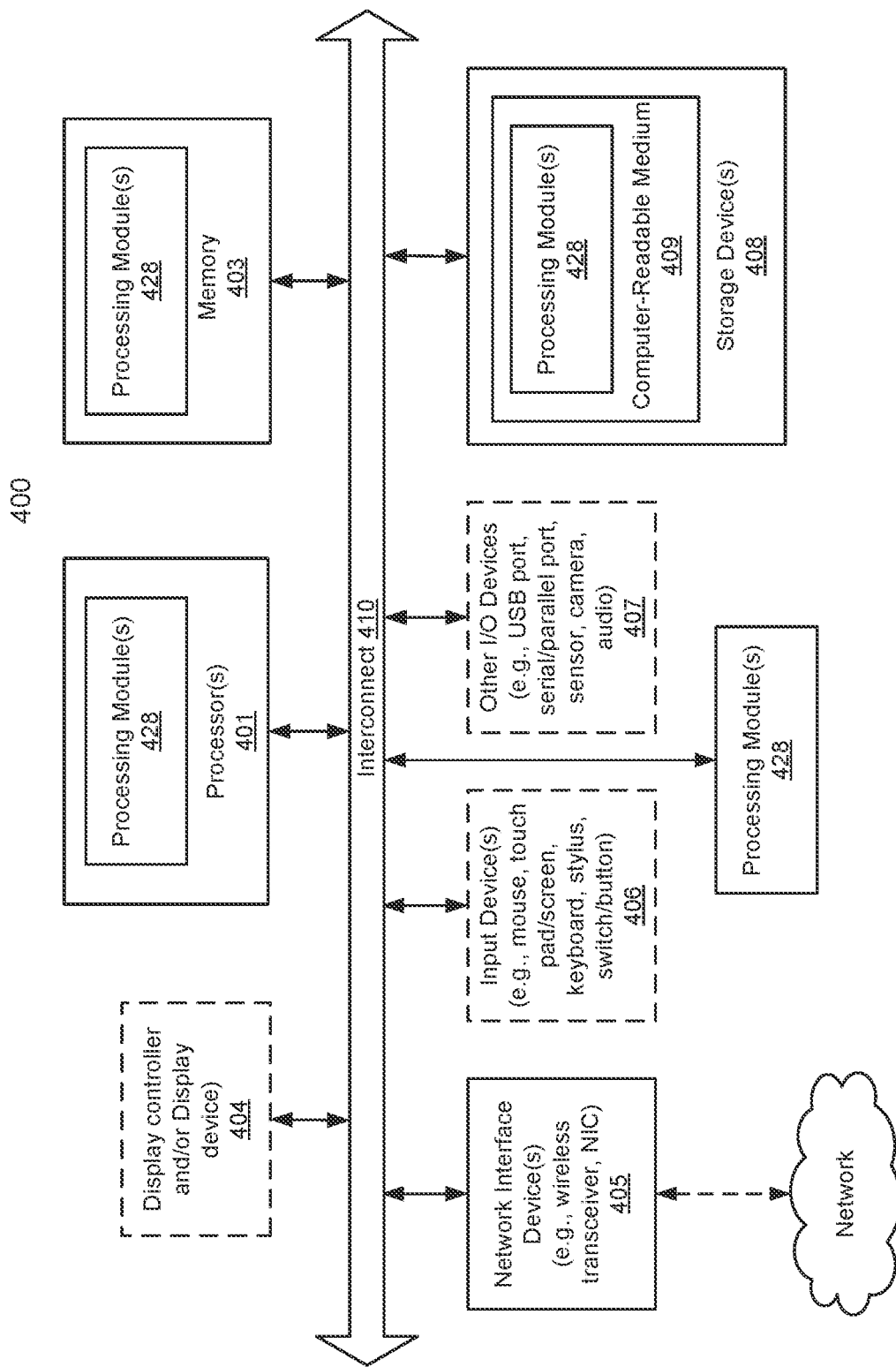
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing deployments, the method comprising:
   identifying infrastructure of a deployment for vulnerability analysis;
   identifying computing resource availability for the infrastructure;
   making a determination, based on the computing resource availability, whether to perform an infrastructure based component analysis for the infrastructure that consumes at least a portion of computing resources of the infrastructure;
   in a first instance of the determination where the infrastructure based component analysis is to be performed:
     performing the infrastructure based component analysis of the infrastructure to obtain a first component inventory for the infrastructure;

performing the vulnerability analysis using the first component inventory to identify a first at least one vulnerability;
performing a remediation for the infrastructure based on the first at least one vulnerability;
in a second instance of the determination where the infrastructure based component analysis is not to be performed:
performing a historic component analysis of the infrastructure to obtain a second component inventory for the infrastructure, the historic component analysis not consuming any computing resources of the infrastructure;
performing the vulnerability analysis using the second component inventory to identify a second at least one vulnerability; and
performing a remediation for the infrastructure based on the second at least one vulnerability.

2. The method of claim 1, wherein identifying the computing resource availability for the infrastructure comprises:
identifying types of data processing systems of the infrastructure; and
matching the types of the data processing systems to corresponding quantities of computing resources to identify the computing resource availability.

3. The method of claim 2, wherein making the determination comprises:
making a comparison between the computing resource availability and a computing resource availability threshold;
in a first instance of the comparison where the computing resource availability exceeds the computing resource availability threshold:
determining to perform the infrastructure based component analysis; and
in a second instance of the comparison where the computing resource availability does not exceed the computing resource availability threshold:
determining to not perform the infrastructure based component analysis.

4. The method of claim 1, wherein performing the historic component analysis of the infrastructure to obtain the second component inventory for the infrastructure comprises:
obtaining a first component list for the infrastructure, the first component list being based on a design for the infrastructure prior to the infrastructure being deployed;
obtaining a second component list for the infrastructure, the second component list being based on an operator provided report for the infrastructure after the infrastructure being deployed; and
identifying a third component list for the infrastructure using the first component list and the second component list.

5. The method of claim 4, wherein performing the infrastructure based component analysis of the infrastructure to obtain the first component inventory for the infrastructure comprises:
scanning data processing systems of the infrastructure to obtain a fourth component list.

6. The method of claim 5, wherein scanning the data processing systems comprises:
sending instructions to the data processing systems of the infrastructure to initiate performance of a self-inventory by the data processing systems;
receiving copies of self-inventories from the data processing systems; and
obtaining the fourth component list using the self-inventories, each of the self-inventories specifying self-identified components of the data processing systems.

7. The method of claim 6, wherein performing the vulnerability analysis using the second component inventory to identify a second at least one vulnerability comprises:
for each component specified by the third component list:
matching at least one of a type of the component, and a version of the component against vulnerabilities in a vulnerability repository to identify the second at least one vulnerability.

8. A non-transitory machine-readable medium having instructions stored therein, which when executed by a processor, cause the processor to perform operations for managing deployments, the operations comprising:
identifying infrastructure of a deployment for vulnerability analysis;
identifying computing resource availability for the infrastructure;
making a determination, based on the computing resource availability, whether to perform an infrastructure based component analysis for the infrastructure that consumes at least a portion of computing resources of the infrastructure;
in a first instance of the determination where the infrastructure based component analysis is to be performed:
performing the infrastructure based component analysis of the infrastructure to obtain a first component inventory for the infrastructure;
performing the vulnerability analysis using the first component inventory to identify a first at least one vulnerability;
performing a remediation for the infrastructure based on the first at least one vulnerability;
in a second instance of the determination where the infrastructure based component analysis is not to be performed:
performing a historic component analysis of the infrastructure to obtain a second component inventory for the infrastructure, the historic component analysis not consuming any computing resources of the infrastructure;
performing the vulnerability analysis using the second component inventory to identify a second at least one vulnerability; and
performing a remediation for the infrastructure based on the second at least one vulnerability.

9. The non-transitory machine-readable medium of claim 8, wherein identifying the computing resource availability for the infrastructure comprises:
identifying types of data processing systems of the infrastructure; and
matching the types of the data processing systems to corresponding quantities of computing resources to identify the computing resource availability.

10. The non-transitory machine-readable medium of claim 9, wherein making the determination comprises:
making a comparison between the computing resource availability and a computing resource availability threshold;
in a first instance of the comparison where the computing resource availability exceeds the computing resource availability threshold:
determining to perform the infrastructure based component analysis; and in a second instance of the comparison where the computing resource availability does not exceed the computing resource availability threshold:
  determining to not perform the infrastructure based component analysis.

11. The non-transitory machine-readable medium of claim 8, wherein performing the historic component analysis of the infrastructure to obtain the second component inventory for the infrastructure comprises:
  obtaining a first component list for the infrastructure, the first component list being based on a design for the infrastructure prior to the infrastructure being deployed;
  obtaining a second component list for the infrastructure, the second component list being based on an operator provided report for the infrastructure after the infrastructure being deployed; and
  identifying a third component list for the infrastructure using the first component list and the second component list.

12. The non-transitory machine-readable medium of claim 11, wherein performing the infrastructure based component analysis of the infrastructure to obtain the first component inventory for the infrastructure comprises:
  scanning data processing systems of the infrastructure to obtain a fourth component list.

13. The non-transitory machine-readable medium of claim 12, wherein scanning the data processing systems comprises:
  sending instructions to the data processing systems of the infrastructure to initiate performance of a self-inventory by the data processing systems;
  receiving copies of self-inventories from the data processing systems; and
  obtaining the fourth component list using the self-inventories, each of the self-inventories specifying self-identified components of the data processing systems.

14. The non-transitory machine-readable medium of claim 13, wherein performing the vulnerability analysis using the second component inventory to identify a second at least one vulnerability comprises:
  for each component specified by the third component list:
    matching at least one of a type of the component, and a version of the component against vulnerabilities in a vulnerability repository to identify the second at least one vulnerability.

15. A deployment manager, comprising:
  a processor; and
  a memory coupled to the processor to store instructions, which when executed by the processor, cause the processor to perform operations for managing deployments, the operations comprising:
    identifying infrastructure of a deployment for vulnerability analysis;
    identifying computing resource availability for the infrastructure;
    making a determination, based on the computing resource availability, whether to perform an infrastructure based component analysis for the infrastructure that consumes at least a portion of computing resources of the infrastructure;
    in a first instance of the determination where the infrastructure based component analysis is to be performed:
      performing the infrastructure based component analysis of the infrastructure to obtain a first component inventory for the infrastructure;
      performing the vulnerability analysis using the first component inventory to identify a first at least one vulnerability;
      performing a remediation for the infrastructure based on the first at least one vulnerability;
    in a second instance of the determination where the infrastructure based component analysis is not to be performed:
      performing a historic component analysis of the infrastructure to obtain a second component inventory for the infrastructure, the historic component analysis not consuming any computing resources of the infrastructure;
      performing the vulnerability analysis using the second component inventory to identify a second at least one vulnerability; and
      performing a remediation for the infrastructure based on the second at least one vulnerability.

16. The deployment manager of claim 15, wherein identifying the computing resource availability for the infrastructure comprises:
  identifying types of data processing systems of the infrastructure; and
  matching the types of the data processing systems to corresponding quantities of computing resources to identify the computing resource availability.

17. The deployment manager of claim 16, wherein making the determination comprises:
  making a comparison between the computing resource availability and a computing resource availability threshold;
  in a first instance of the comparison where the computing resource availability exceeds the computing resource availability threshold:
    determining to perform the infrastructure based component analysis; and
  in a second instance of the comparison where the computing resource availability does not exceed the computing resource availability threshold:
    determining to not perform the infrastructure based component analysis.

18. The deployment manager of claim 17, wherein performing the historic component analysis of the infrastructure to obtain the second component inventory for the infrastructure comprises:
  obtaining a first component list for the infrastructure, the first component list being based on a design for the infrastructure prior to the infrastructure being deployed;
  obtaining a second component list for the infrastructure, the second component list being based on an operator provided report for the infrastructure after the infrastructure being deployed; and
  identifying a third component list for the infrastructure using the first component list and the second component list.

19. The deployment manager of claim 15, wherein performing the infrastructure based component analysis of the infrastructure to obtain the first component inventory for the infrastructure comprises:
  scanning data processing systems of the infrastructure to obtain a fourth component list.

20. The deployment manager of claim 19, wherein scanning the data processing systems comprises:
  sending instructions to the data processing systems of the infrastructure to initiate performance of a self-inventory by the data processing systems;

receiving copies of self-inventories from the data processing systems; and obtaining the fourth component list using the self-inventories, each of the self-inventories specifying self-identified components of the data processing systems.

* * * * *